United States Patent [19]
Fang et al.

[11] Patent Number: 5,666,121
[45] Date of Patent: Sep. 9, 1997

[54] VLSI PROCESSOR DESIGN OF REAL-TIME DATA COMPRESSION FOR HIGH RESOLUTION IMAGING RADAR

[75] Inventors: Wai-Chi Fang, San Marino; William T. K. Johnson, La Canada, both of Calif.

[73] Assignee: California Institute of Technology, Pasadena, Calif.

[21] Appl. No.: 530,514

[22] Filed: Sep. 19, 1995

[51] Int. Cl.⁶ ................................................ G01S 13/90
[52] U.S. Cl. ........................ 342/25; 342/162; 342/191; 342/197
[58] Field of Search ........................ 342/25, 162, 179, 342/191, 194, 197

[56] References Cited

U.S. PATENT DOCUMENTS

| | | | |
|---|---|---|---|
| 3,557,303 | 1/1971 | Jordan et al. | 358/521 |
| 4,635,217 | 1/1987 | O'Connor et al. | 364/574 |
| 4,646,254 | 2/1987 | O'Connor et al. | 364/574 |
| 4,885,636 | 12/1989 | Sullivan | 358/133 |
| 5,287,200 | 2/1994 | Sullivan et al. | 358/433 |

OTHER PUBLICATIONS

"Spaceborne Radar Remote Sensing: Applications and Techniques," by Charles Elachi, pp. 98–100, 1987; The Institute of electrical Electronics Engineers, Inc., New York.

"Image and Video Conmpression with VLSI Neural Networks," by Wai–Chi Fang and Bing J. Sheu; pp. 1–10.

"Block Adaptive Quantization of Magellan SAR Data," by Ronald Kwok and William T.K. Johnson; pp. 375–382; 1989.

*Primary Examiner*—John B. Sotomayor
*Attorney, Agent, or Firm*—Michaelson & Wallace

[57] ABSTRACT

The present invention is a block adaptive quantizer and an associated VLSI processor to provide real-time data compression for high resolution imaging radar systems. The block adaptive quantizer receives data from a synthetic radar aperture in a burst-mode. The block adaptive quantizer encodes and quantizes the data via a data-compression scheme. The image data is encoded by the block adaptive quantizer using thresholds generated from current bursts of image data collected.

21 Claims, 4 Drawing Sheets

VLSI PROCESSOR DESIGN OF REAL-TIME DATA COMPRESSION FOR HIGH RESOLUTION IMAGING RADAR

BACKGROUND OF THE INVENTION

2. Origin of the Invention

The invention described herein was made in the performance of work under a NASA contract, and is subject to the provisions of Public Law 96-517 (35 USC 202) in which the contractor has elected to retain title.

2. Field of the Invention

The present invention relates, in general to real-time data compression of raw imaging data for high resolution imaging radar systems, and in particular to a block adaptive quantizer and an associated VLSI processor to provide real-time data compression for high resolution imaging radar systems.

RELATED ART

Earth observation platforms and planetary missions acquire surface data of various planets in the solar system. The scientific objectives of these missions are to improve the knowledge of the tectonics and geologic history of the planets by analysis of the surface morphology, the geophysics of the planet, principally its density and distribution, and small-scale surface physics. Consequently, the spacecrafts used in these missions must contain high resolution imaging radar systems.

The radar systems acquire the necessary planetary data and then transmit the acquired data back to Earth. FIG. 1 is a block diagram illustrating the communication between a typical imaging radar system and Earth. The imaging radar system 10 includes a synthetic aperture radar 12 (SAR) with an input 14 for collecting regional and large scale high resolution surface image data signals. The synthetic aperture radar 12 also has an output 16 for transmitting the data signals collected via a communication channel 18 to a ground area 20 on Earth.

The communication channel 18 capacity between the spacecraft and Earth is limited. This limited channel capacity 18 confines the transmittible data signal rate. As a result, the data collected by the synthetic aperture radar 12 must be encoded before being transmitted via the communication channel 18 in order to reduce the data transmission rate.

Block adaptive quantization is one encoding data compression method for single-beam SAR raw data collection. A block adaptive quantizer 22 provides data compression of the signal source with time-varying parameters. The block adaptive quantizer 22 encodes the signal by estimating statistics of the signal source and matching a quantizer to the observed time-varying statistics. The encoded data signal is then transmitted to the ground area 20 on Earth where it is reconstructed as a facsimile of the original signal. The SAR typically produces 8-bit inphase and quadrature data samples. These 8-bit data samples are reduced to data rates of 2 bits per inphase and quadrature by the block adaptive quantizer.

One current block adaptive quantizer employs burst-mode data collection to reduce the data rate. Burst-mode data collection is a time-domain data reduction method where the radar does not operate continuously. However, this method does not work efficiently for advanced imaging data collection. This is because the raw data collected is encoded using thresholds generated from previous bursts of data collection due to limited on-board real-time processing and lack of efficient algorithms. Also, for advanced imaging radar data systems due to variable data rate and multiple-beam imagine requirements, programmable compression ratios are needed.

Therefore, what is needed is real-time data compression of raw imaging data for high resolution imaging radar systems with programmable compression ratios which satisfies communication and storage constraints. What is also needed is an associated VLSI processor to provide the real-time data compression for the high-resolution imaging radar systems. What is further needed is a block adaptive quantizer for multiple-beam SAR imaging which limits degradation of an image.

Whatever the merits of the above mentioned systems and methods, they do not achieve the benefits of the present invention.

SUMMARY OF THE INVENTION

TO overcome the limitations in the prior art described above, and to overcome other limitations that will become apparent upon reading and understanding the present specification, the present invention is a block adaptive quantizer and an associated VLSI processor to provide real-time data compression for high resolution imaging radar systems.

The image data compression system includes a radar for collecting a plurality of intermittent bursts of image data and a block adaptive quantizer receiving the plurality of intermittent bursts of image data. The block adaptive quantizer has an adaptive threshold estimator with estimation equations for generating a current quantizer control for each burst of image data. Also, the block adaptive quantizer includes a magnitude encoder for encoding the equations and the associated look-up table so that each burst of image data uses the respective current quantizer control so that the image data is compressed. A decoder with decoding logic and decoding equations is located at a remote location for receiving and reconstructing the encoded image data into its original form.

The system collects the image data in analog format and further includes an analog to digital converter for converting the analog signal to digital format. The system also has a data buffer coupled between the radar and the block adaptive quantizer for temporarily storing the plurality of intermittent bursts of image data and for transmitting the plurality of intermittent bursts of image data to the block adaptive quantizer on demand.

A feature of the present invention is that the thresholds are generated from current bursts of data so that the encoding look-up table is optimized. Another feature of the present invention is that the compression ratios are programmable. An advantage of the present invention is that performance degradation of previous block adaptive quantizers in multiple-beam data compression schemes for advanced high-resolution imaging is alleviated.

The foregoing and still further features and advantages of the present invention as well as a more complete understanding thereof will be made apparent from a study of the following detailed description of the invention in connection with the accompanying drawings and appended claims.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Figure 2:
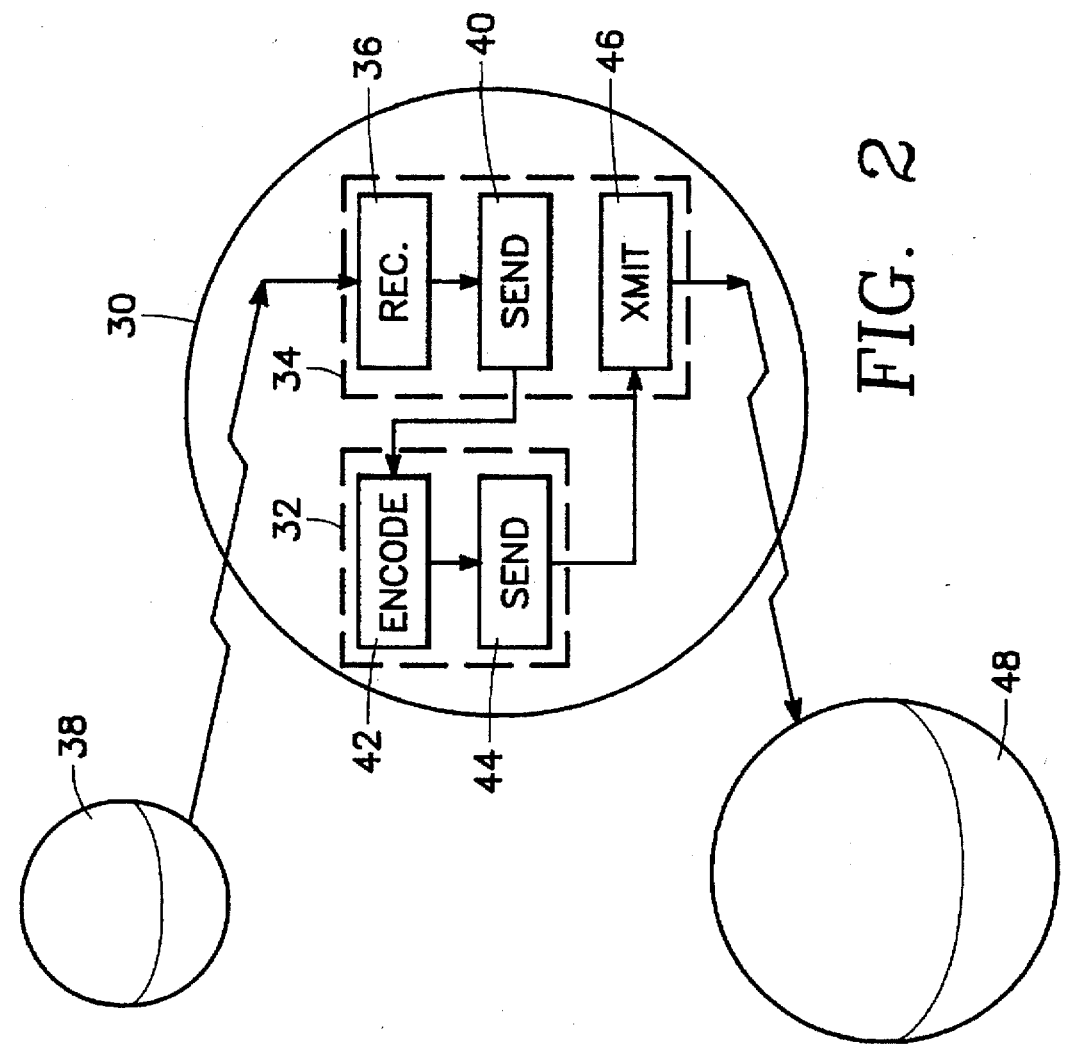
FIG. 2 is a block diagram illustrating the general operation of the synthetic radar aperture of the present invention.
Figure 1:
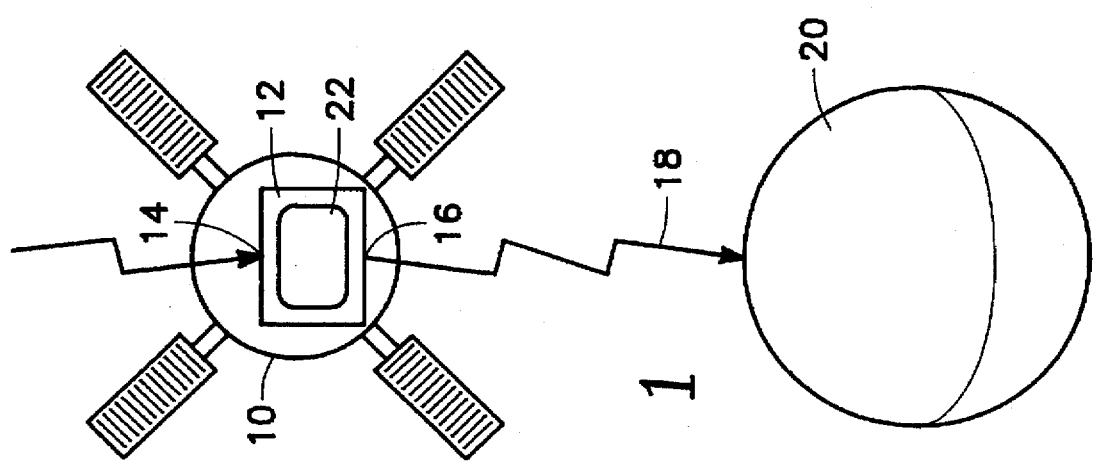
FIG. 1 is a block diagram illustrating the communication between a typical imaging radar system and Earth.

FIG. 2 is a block diagram illustrating the general operation of the synthetic radar aperture of the present invention. A spacecraft for planetary missions contains a synthetic radar aperture 30. The synthetic radar aperture 30 includes a block adaptive quantizer 32, with preferably 2-bit conversion capabilities, coupled to a transceiver 34. One type of block adaptive quantizer is described in "Block Adaptive Quantization of Magellan SAR Data", IEEE Trans. on Geoscience and Remote Sensing, Vol. 27, No. 4, July 1989, by R. Kwok and T. K. Johnson, the disclosure of which is incorporated by reference in its entirety.

The transceiver 34 records 36 image data of a particular planet 38 during the spacecraft's low-altitude orbit of the planet 38. The transceiver 34 produces 8-bit inphase and quadrature data samples. Data collection for the synthetic radar aperture 30 is operated in a burst-mode. Burst-mode data collection is a time-domain data collection method for reducing the transferred data rate. For example, the transceiver 34 does not record the image data continuously, but instead, records the image data in bursts, intermittently.

The transceiver 34 sends 40 the burst-mode recorded image data to the block adaptive quantizer 32 for encoding 42 so that the data is quantized via a data-compression scheme (discussed below). The image data is encoded 42 by the block adaptive quantizer 32 using quantizer controls (thresholds) generated from current bursts of image data collected by the transceiver 34. Various pre-programmed compression ratios (8:1, 8:2, or 8:4) can be used depending on the ratio required. The encoded data is then sent 44 back to the transceiver 34 for transmitting 46 the encoded data to Earth 48.

On most planetary missions, the synthetic radar aperture 30 is required to produce contiguous images of at least seventy percent of the planet's surface. Additional requirements include a radar resolution better than 300 m, a surface brightness temperature with a resolution better than 2 K., and topographic and scattering characteristic maps with a height resolution better than 50 m.

Block Adaptive Alogorithm

The algorithm for the block adaptive quantizer provides real-time data compression for high resolution imaging radar systems. First the synthetic radar aperture 30 collects a plurality of intermittent bursts of image data and then the block adaptive quantizer 32 receives the plurality of intermittent bursts of image data. Next, the block adaptive quantizer 32 generates a current quantizer control for each burst of image data with an adaptive threshold estimator. A magnitude encoder encodes each burst of image data using the respective current quantizer control so that the image data is compressed. Various pre-programmed compression ratios can be used depending on the ratio required. Last, a decoder located at a remote location, receives and reconstructs the encoded image data into its original form.

Block Adaptive Quantizer Architecture

Figure 3:
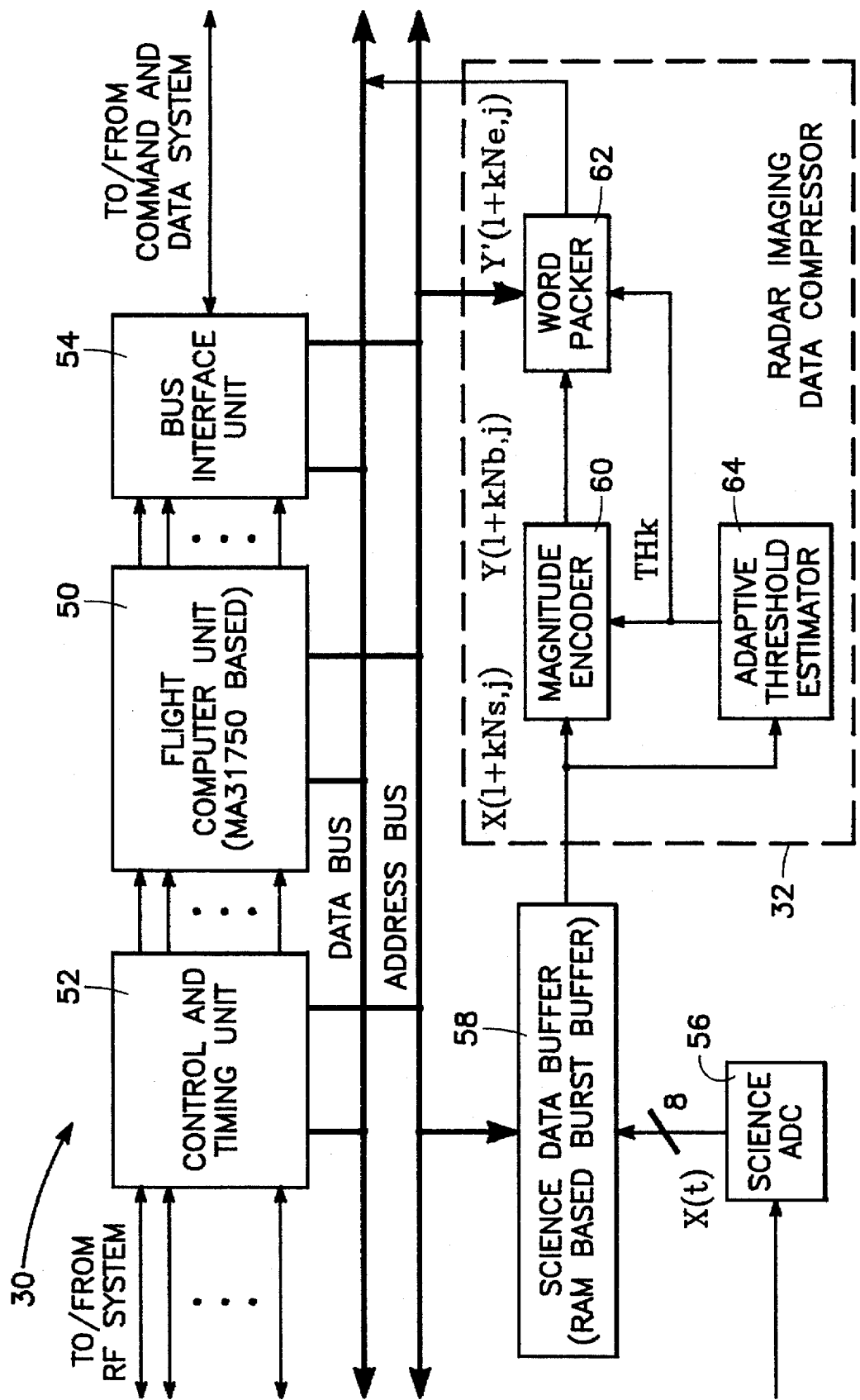
FIG. 3 is a block diagram illustrating the general architecture of the high resolution real-time block adaptive quantizer and its host on-board data system.

FIG. 3 is a block diagram illustrating the general architecture of the high resolution real-time block adaptive quantizer and its interfaces with other portions of the synthetic aperture radar of the present invention. The synthetic aperture radar 30 includes a flight computer unit 50, a control and timing unit 52, a bus interface 54, an analog to digital converter 56, and a data buffer 58. The block adaptive quantizer 32 includes a magnitude encoder 60, a word packer 62, and an adaptive threshold estimator 64. The block adaptive quantizer 32 can be a single VLSI chip using 1-µm CMOS technology.

The control and timing unit 52 sends and receives data signals to and from an RF communications system for controlling and timing the data signals. The flight computer unit 50 controls flight operations of the spacecraft and receives signals from the control and timing unit 52 and sends signals to the bus interface unit 54. The bus interface unit 54 sends and receives signals to and from a command data system. The control and timing unit 52, flight computer unit 50, and the bus interface unit 54 are coupled to the block adaptive quantizer 32 through a data bus with a local address bus.

The collected image data of the planet 38 of FIG. 2 is an analog radar data waveform. This analog waveform is converted to a digital radar sample sequence, X(t), by the analog-to-digital converter 56, preferably at a sampling rate of up to 30 MHz. Each digital radar data sample is an 8-bit sign-magnitude data. Digital radar data samples are selectively packed in 16 bit words and loaded into the data buffer 58 during a receive-window burst interval.

Each 8-bit data sample is encoded into 2 bits. One bit is a sign bit and the other bit indicates a signal level. The signal-level bit indicates whether the magnitude of the inphase or quadrature sample is above or below a certain threshold value. The threshold represents the transition point that is optimally placed in an ensemble of input data with a Gaussian probability density such that the distortion in the reconstructed data is minimized in a mean square-error sense.

Each digital radar data sample burst contains return echos. The digital radar data samples of each echo of a burst are partitioned into blocks, where each block includes $N_s$ successive samples. For the i-th burst, the radar data sample of the j-th echo is denoted by $X(l+kN_s,j)$. Where l is a sample index in a block, k is a block index in an echo, j is an echo index in a given burst, and $0 \leq l \leq N_s-1$, $0 \leq k \leq N_b-1$, $0 \leq j \leq N_e-1$, where $N_s$, $N_b$, $N_e$ are positive integers.

The data buffer 58 is preferably a random access memory (RAM) based science data buffer and buffers a given burst of radar data from the analog-to-digital converter 56 to alleviate real-time processing rate requirements for the adaptive threshold estimator 64. After a given burst is loaded into the data buffer 58, the magnitude encoder 60 and the adaptive threshold estimator 64 of the block adaptive quantizer 32 reads the corresponding radar data samples.

The adaptive threshold estimator 64 calculates the quantizer controls or thresholds of the data samples. The thresholds are calculated using blocks of data samples in accordance with the method described in "Block Adaptive Quantization of Magellan SAR Data" by Kwok and Johnson (supra). An optimized coding look-up table is utilized to find the proper threshold.

Corresponding data samples in the k-th block are encoded by the magnitude encoder 60 whenever a threshold of the k-th block, $TH_k$, is available from the adaptive threshold estimator 64. As a result, for each burst, the block adaptive quantizer 32 encodes the received 8-bit data using thresholds generated from the current burst. The word packer 62 then packs the encoded data from each burst into words. Next, the flight computer unit 50 collects both the packed data and the thresholds into the data buffer 58. The encoded data is sent to Earth where it is reconstructed by, for example, a decoder.

Figure 4:
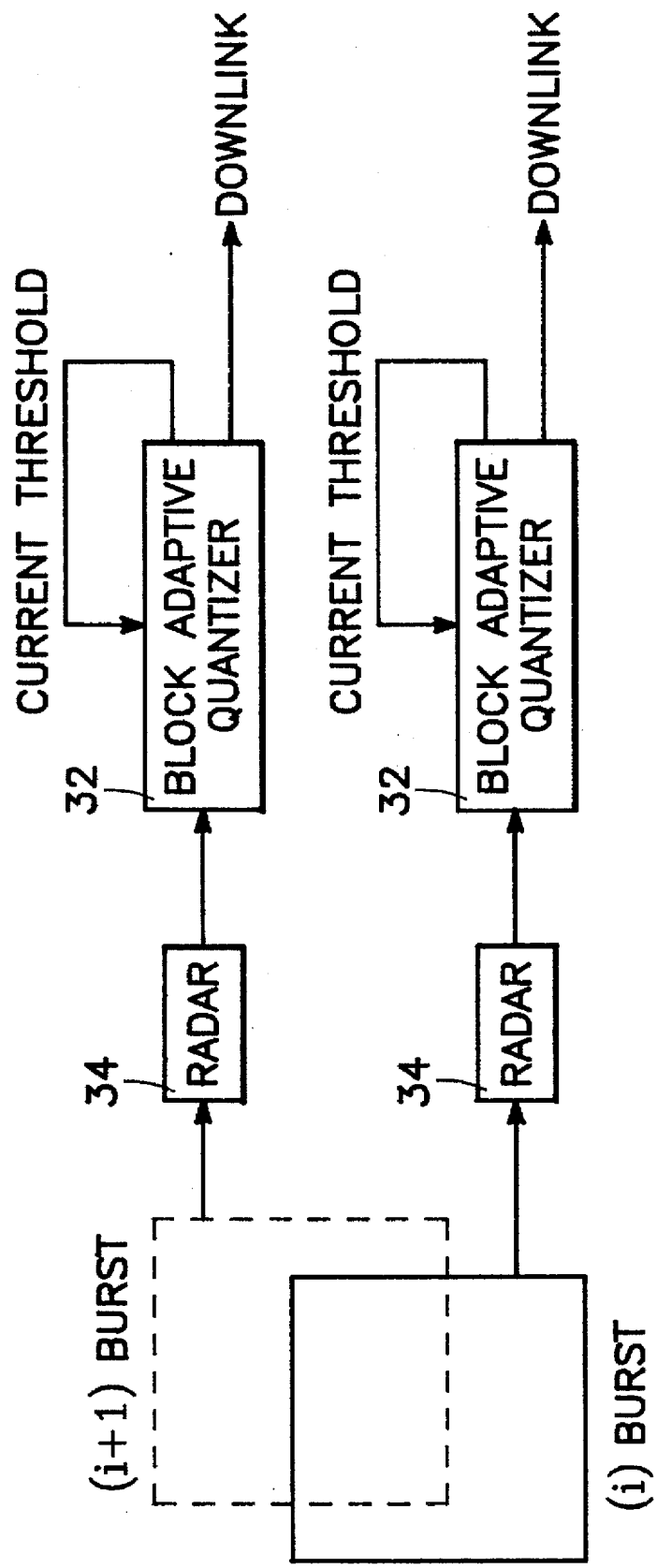
FIG. 4 is a block diagram illustrating a functional block diagram of the block adaptive quantizer utilizing current burst thresholds.
Figure 5:
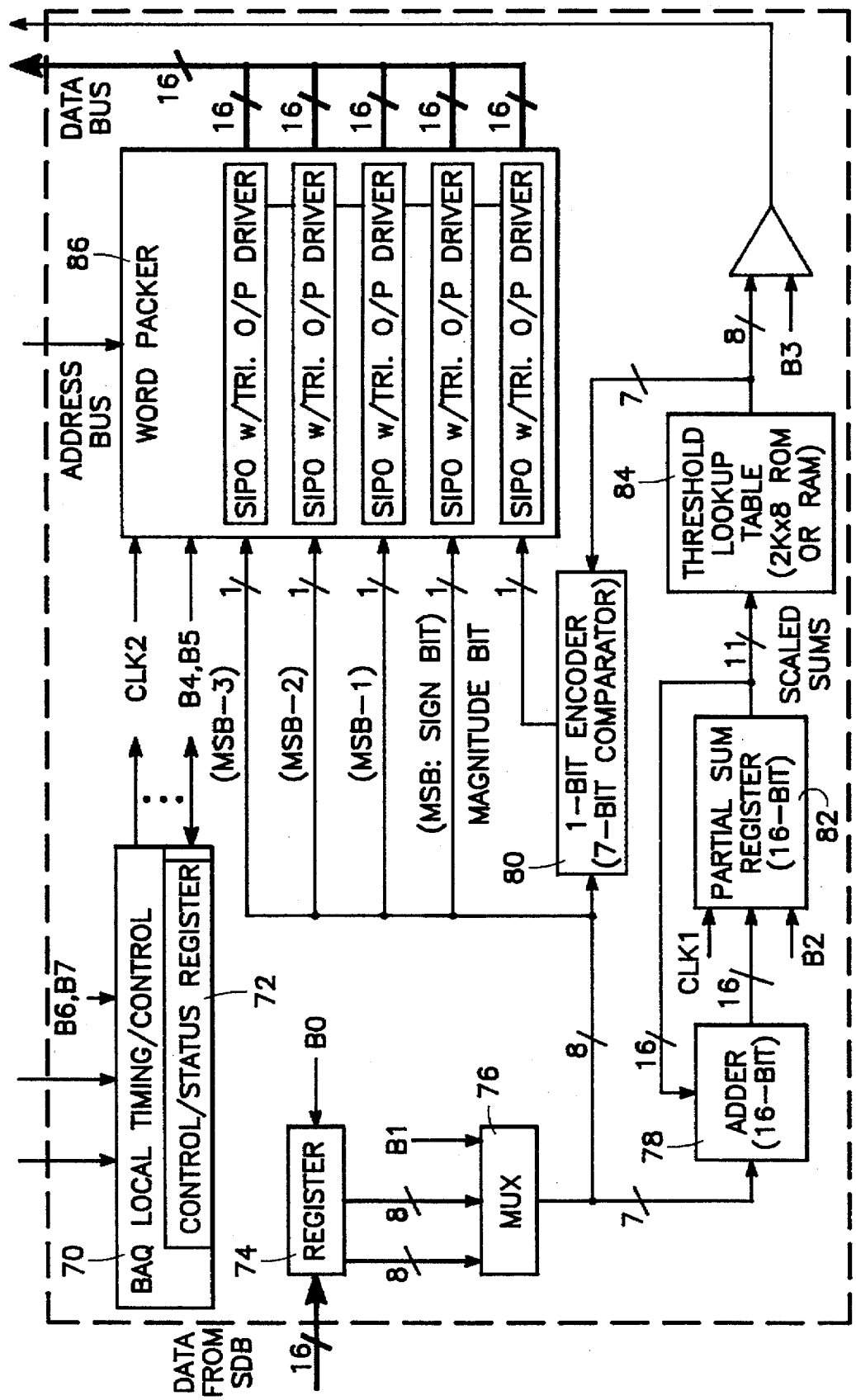
FIG. 5 is a block diagram illustrating the associated VLSI processor of the block adaptive quantizer of the present invention.

FIG. 4 is a block diagram illustrating a functional block diagram of the block adaptive quantizer utilizing current burst thresholds. During the operation of the synthetic aperture radar 30, the thresholds that are used to encode the return echos from a given burst are those generated during a current burst.

Referring to FIG. 4, the i to i+1 bursts are received by the transceiver 34 and sent to the block adaptive quantizer 32 as 8-bit data. The block adaptive quantizer 32 generates thresholds for each burst. These thresholds are used to encode the received 8-bit data. Next, the encoded data is transmitted to Earth. Thus, since the thresholds are generated from the current burst and not the previous burst, the encoding look-up table is minimized. In addition, performance degradation of previous block adaptive quantizers in multiple-beam data compression schemes for advanced high-resolution imaging is alleviated with the present invention.

VLSI Implementation

FIG. 6 is a block diagram illustrating the associated VLSI processor of the block adaptive quantizer of the present invention. The VLSI processor includes a local timing controller 70 coupled to the data buffer 58 of FIG. 3 for generating control and timing signals for processing the data with a control status register 72 for storing control bits and providing status bits from/to a host data system, and a register 74 coupled to the data buffer for buffering an input sample pair from the data buffer 58 of FIG. 3.

The VLSI processor also includes a multiplex 76 (MUX) coupled to the register 74 to select the input sample for magnitude estimation, an adder 78 coupled to the multiplex 76 for calculating the magnitude estimation, a bit encoder 80 coupled to the adder 78 for generating the magnitude bit, and a partial sum register 82 coupled to the adder 78 for storing the partial estimation at a sample clock rate. The VLSI processor further includes a threshold look-up table 84 coupled to the partial sum register 82 for storing pre-determined quantization thresholds in the look-up table and a word packer 86 coupled to the threshold look-up table 84 having five SIP0s with tri-state output drivers for packing the compressed data or passed most significant data links (MSB-1, MSB-2, MSB-3) into 16 bit words.

With respect to the local timing and control circuit 70, first an input data sample pair is loaded (B0) and then selected (B1). A magnitude calculation is performed to enable (B2) output data when the calculations are finished. The output is also enabled (B3) when the quantization threshold is ready. Next, the input of the word packer is enabled (B4) and then the output of the word packer is enabled (B5). Last, control bits of the selected compression ratio are input from the host data system (B6, B7).

The block adaptive quantizer 32 can be a single VLSI chip using 1-μm CMOS technology. The VLSI chip can have a silicon area of 6171 μm by 6629 μm. The encoding rate is preferably up to 30M pixels per second and the end-to-end pipeline latency is 32 clock cycles. A block adaptive quantizer integrated on a VLSI integrated circuit can provided high speed data compression ratios of 8:1, 8:2, or 8:4 at 30M pixels per second.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An image data compression system, comprising:
   means for collecting a plurality of intermittent bursts of image data;
   a block adaptive quantizer receiving said plurality of intermittent bursts of image data having means for generating a current quantizer control for each burst of image data and means for encoding each of said burst of image data in real-time by using said respective current quantizer control so that said image data is compressed in real-time;
   wherein said means for encoding has a plurality of selectable pre-programmed compression ratios;
   means for selectively activating at least one of said plurality of pre-programmed compression ratios; and
   a decoder for reconstructing said encoded image data into its original form.

2. The system of claim 1 wherein said means for generating a current quantizer control is an adaptive threshold estimator.

3. The system of claim 1 wherein said means for encoding each of said burst of image data is a magnitude encoder.

4. The system of claim 1 further comprising means coupled to said means for encoding each of said burst of image data for packing said encoded data.

5. The system of claim 4 wherein said means for packing said encoded data is a word packer.

6. The system of claim 1 wherein said data is collected in analog format, said system further comprising an analog to digital converter coupled between said means for collecting data and said block adaptive quantizer for converting said analog signal to digital format.

7. The system of claim 1 further comprising a data buffer coupled between said means for collecting a plurality of intermittent bursts of image data and said block adaptive quantizer for temporarily storing said plurality of intermittent bursts of image data and for transmitting said plurality of intermittent bursts of image data to said block adaptive quantizer on demand.

8. The system of claim 1 wherein said means for collecting said plurality of intermittent bursts of image data is a radar.

9. A method for compressing image data, comprising:
   collecting a plurality of intermittent bursts of image data;
   receiving said plurality of intermittent bursts of image data by a block adaptive quantizer;
   generating a current quantizer control for each burst of image data;
   selectively activating at least one of a plurality of pre-programmed compression ratios;
   encoding each of said burst of image data in real-time by using said respective current quantizer control so that said image data is compressed in real-time; and reconstructing said encoded image data into its original form.

10. The method of claim 9 further comprising, after said step of encoding each of said burst of image data, the step of packing said encoded data.

11. The method of claim 9 wherein said data collected in said collecting step is collected in analog format, said method further comprising, after the step of collecting, the step of converting said analog signal to digital format.

12. The method of claim 9 further comprising, after the collecting step, the steps of storing temporarily said plurality of intermittent bursts of image data and transmitting said plurality of intermittent bursts of image data to said block adaptive quantizer on demand.

13. A synthetic aperture radar imaging system located on a planetary spacecraft, comprising:

a transceiver located on said spacecraft for collecting a plurality of intermittent bursts of image data;

a block adaptive quantizer located on said spacecraft and coupled to said transceiver for receiving said plurality of intermittent bursts of image data, said block adaptive quantizer having an adaptive threshold estimator for generating a threshold value, representing a current quantizer control, for each burst of image data, a magnitude encoder for encoding each of said burst of image data in real-time by using said respective threshold value representing said current quantizer control so that said image data is compressed in real-time, and a word packer for packing said encoded data from each burst into readable bit words;

wherein said transceiver receives said encoded image data from said block adaptive quantizer and transmits said encoded image data to a remote location; and a decoder located at said remote location for reconstructing said encoded image data into its original form.

14. The system of claim 13 wherein said data is collected in analog format, said system further comprising an analog to digital converter coupled between said transceiver and said block adaptive quantizer for converting said analog signal to digital format.

15. The system of claim 13 further comprising a data buffer coupled between said transceiver and said block adaptive quantizer for temporarily storing said plurality of intermittent bursts of image data and for transmitting said plurality of intermittent bursts of image data to said block adaptive quantizer on demand.

16. The system of claim 13 wherein said data is collected in analog format, said system further comprising an analog to digital converter coupled between said host data system and said block adaptive quantizer for converting said analog signal to digital format.

17. A synthetic aperture radar imaging system having a host data system for collecting image data and a data buffer for temporarily storing the image data coupled to a processor, said processor comprising:

a local timing controller coupled to said data buffer for generating control and timing signals for processing data and having a control status register for storing control bits and providing status bits from/to said host data system;

a register coupled to said data buffer for buffering an input sample pair from said data buffer;

a multiplex coupled to said register for selecting said input sample for magnitude estimation;

an adder coupled to said multiplex for calculating said magnitude estimation;

a bit encoder coupled to said adder for generating said magnitude bit;

a partial sum register coupled to said adder for storing said partial estimation at a sample clock rate;

a threshold look-up table coupled to said partial sum register for storing pre-determined quantization thresholds in said look-up table;

a word packer coupled to said threshold look-up table having five SIPOs with tri-state output drivers for packing either said data or a plurality of passed most significant data links into 16 bit words.

18. The system of claim 17 wherein said data is collected in analog format, said system further comprising an analog to digital converter coupled between said host data system and said block adaptive quantizer for converting said analog signal to digital format.

19. The system of claim 17 wherein said bit encoder further comprises a plurality of selectable pre-programmed compression ratios and means for selectively activating at least one of said plurality of pre-programmed compression ratios.

20. The system of claim 17 wherein said magnitude encoder further comprises a plurality of selectable pre-programmed compression ratios and means for selectively activating at least one of said plurality of pre-programmed compression ratios.

21. A synthetic aperture radar imaging system located on a planetary spacecraft, comprising:

a host data system located on said spacecraft for collecting a plurality of intermittent bursts of image data;

a data buffer for temporarily storing the bursts of image data;

a local timing controller coupled to said data buffer for generating control and timing signals for processing data and having a control status register for storing control bits and providing status bits from/to said host data system;

a block adaptive quantizer coupled to said data buffer for receiving said plurality of intermittent bursts of image data, said block adaptive quantizer having an adaptive threshold estimator for generating a threshold value for each burst of image data, a magnitude encoder for encoding each of said burst of image data in real-time by using said respective threshold value so that said image data is compressed in real-time, and a word packer for packing said encoded data from each burst into readable bit words;

wherein said host data system receives said encoded image data from said block adaptive quantizer and transmits said encoded image data to a remote location; and a decoder located at said remote location for reconstructing said encoded image data into its original form.

* * * * *